United States Patent
Hefty et al.

(10) Patent No.: US 10,055,371 B2
(45) Date of Patent: Aug. 21, 2018

(54) APPARATUS AND METHOD FOR RDMA WITH COMMIT ACKS

(71) Applicant: Intel Corporation, Santa Clara, CA (US)

(72) Inventors: Mark S. Hefty, Aloha, OR (US); Robert J. Woodruff, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 599 days.

(21) Appl. No.: 14/531,551

(22) Filed: Nov. 3, 2014

(65) Prior Publication Data

US 2016/0124877 A1    May 5, 2016

(51) Int. Cl.
    *G06F 13/36*    (2006.01)
    *G06F 13/28*    (2006.01)
    *G06F 3/06*     (2006.01)
    *G06F 13/40*    (2006.01)

(52) U.S. Cl.
    CPC ............ *G06F 13/28* (2013.01); *G06F 3/0611* (2013.01); *G06F 3/0631* (2013.01); *G06F 3/0679* (2013.01); *G06F 13/4027* (2013.01)

(58) Field of Classification Search
    None
    See application file for complete search history.

(56) References Cited

U.S. PATENT DOCUMENTS 5,916,307 A * 6/1999 Piskiel .................... G06F 9/546
                                                         718/101
8,874,680 B1   10/2014 Das 2002/0152315 A1 * 10/2002 Kagan .................... H04L 49/90
                                                          709/228
2004/0049774 A1   3/2004 Boyd et al.
2005/0066046 A1   3/2005 Chadalapaka
2005/0203974 A1   9/2005 Smith et al.
2006/0080553 A1   4/2006 Hall
(Continued)

FOREIGN PATENT DOCUMENTS

JP    2006-285919 A    10/2006
JP    2007-518360 A     7/2007
(Continued)

OTHER PUBLICATIONS

Office Action dated Sep. 13, 2016 for Korean Patent Application No. 2015-0138869, 11 pages.
(Continued)

*Primary Examiner* — Henry Tsai
*Assistant Examiner* — Dean Phan
(74) *Attorney, Agent, or Firm* — Schwabe, Williamson & Wyatt, P.C.

(57) ABSTRACT

Embodiments of apparatuses and methods for remote direct memory access (RDMA) with commit acknowledgements (ACKs) are described. In embodiments, a device may include a process queue to store a remote direct memory access (RDMA) request from an initiator to update a target memory. The device may further include a control module, coupled to the process queue, to issue a commit operation to the target memory based on the RDMA request and generate an acknowledgement, ACK, to be sent to the initiator on completion of the commit operation. Other embodiments may be described and/or claimed.

22 Claims, 6 Drawing Sheets

(56) References Cited

U.S. PATENT DOCUMENTS

| | | | |
|---|---|---|---|
| 2010/0228706 A1* | 9/2010 | Labuda | G06F 17/30351 |
| | | | 707/700 |
| 2013/0054726 A1* | 2/2013 | Bugge | G06F 9/52 |
| | | | 709/212 |
| 2014/0108473 A1* | 4/2014 | Nowoczynski | G06F 17/30227 |
| | | | 707/826 |

FOREIGN PATENT DOCUMENTS

| | | |
|---|---|---|
| JP | 2008-217214 A | 9/2008 |
| JP | 2010-281208 A | 12/2010 |
| JP | 2012-048712 A | 3/2012 |
| KR | 20100132413 A | 12/2010 |
| WO | WO2013/101142 A1 | 7/2013 |

OTHER PUBLICATIONS

Extended European Search Report dated Mar. 4, 2016 for European Application No. 15188270.1, 6 pages.

Office Action dated Sep. 6, 2016 for Japanese Patent Application No. 2015-193533, 6 pages.

Office Action dated Dec. 8, 2016 for European Application No. 15188270.1, 3 pages.

Final Notification of Reasons for Refusal dated May 30, 2017 from Japanese Patent Application No. 2015-193533, 5 pages.

Office Action dated Mar. 26, 2018 for Chinese Patent Application No. 201511028369.4, 21 pages.

\* cited by examiner

APPARATUS AND METHOD FOR RDMA WITH COMMIT ACKS

FIELD OF THE INVENTION

The present disclosure relates generally to the technical field of computing, and more particularly, to apparatuses and methods for the remote direct memory access (RDMA) with commit acknowledgements (ACKs).

BACKGROUND

The background description provided herein is for generally presenting the context of the disclosure. Unless otherwise indicated herein, the materials described in this section are not prior art to the claims in this application and are not admitted to be prior art or suggestions of the prior art by inclusion in this section.

Some applications (e.g., databases and distributed file systems) provide high availability and fault tolerance. These applications often need to place data outside of the fault domain of the network, e.g., deliver the data into a target memory domain of a target system, which may consist of non-volatile memory. Thus, these applications need to know whether and when a data transfer operation over a network has completed.

Traditionally, application software may run on the target system to return an acknowledgement indication of the completion of the data transfer operation. Software-based solutions often require data transfers from the network buffers into the application buffers. Further, software-based solutions may introduce severe restrictions on the implementation, and may add significant overhead to the overall operation, both in terms of network latencies and power consumption.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Embodiments of apparatuses and methods for the RDMA with ACKs are described. RDMA capable hardware and the underlying protocol(s) may be modified in order to update target memory regions directly, but with the network acknowledgement deferred until the target write has been committed. In some embodiments, a source device may include a request queue to store a remote direct memory access (RDMA) request to update a target memory outside of a fault domain. The source device may further include a control module, coupled to the request queue, to transfer the RDMA request to a target device with an indication for requesting a commit ACK from the target device upon a completion of the RDMA request by the target device.

In some embodiments, the target device may include a process queue to store a remote direct memory access (RDMA) request from an initiator to update a target memory. The target device may further include a control module, coupled to the process queue, to issue a commit operation to the target memory based on the RDMA request and generate an acknowledgement, ACK, to be sent to the initiator on a completion of the commit operation. These and other aspects of the present disclosure will be more fully described below.

In the following detailed description, reference is made to the accompanying drawings, which form a part hereof, wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

Reference in the description to one embodiment or an embodiment means that a particular feature, structure, or characteristic described in connection with the embodiment is included in at least one embodiment of the invention. The description may use the phrases "in one embodiment," "in another embodiment," "in some embodiments," "in embodiments," "in various embodiments," or the like, which may each refer to one or more of the same or different embodiments. Furthermore, the terms "comprising," "including," "having," and the like, as used with respect to embodiments of the present disclosure, are synonymous.

In embodiments, the term "module" may refer to, be part of, or include an application specific integrated circuit (ASIC), an electronic circuit, a processor (shared, dedicated, or group), and/or memory (shared, dedicated, or group) that execute one or more software or firmware programs, a combinational logic circuit, and/or other suitable components that provide the described functionality. In embodiments, a module may be implemented in firmware, hardware, software, or any combination of firmware, hardware, and software.

Figure 1:
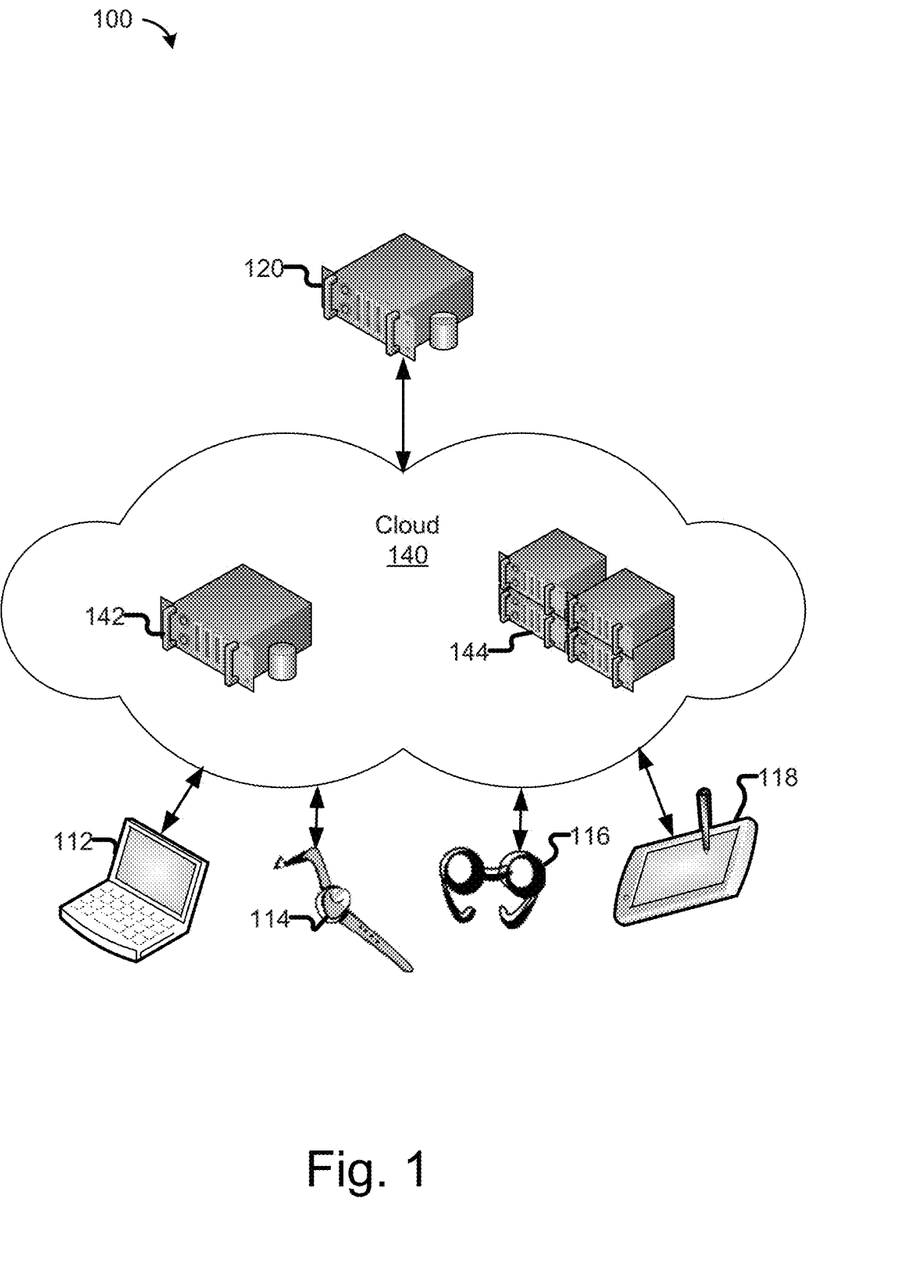
FIG. 1 is a schematic diagram illustrating an example system configuration for the RDMA with commit ACKs, incorporating aspects of the present disclosure, in accordance with various embodiments.

Referring now to FIG. 1, an example system configuration for the RDMA with commit ACKs, in accordance with various embodiments, is illustrated. System 100 may include various source devices and various target devices, where some or all of these devices may have direct or indirect access via networking to each other, e.g., via cloud 140. As illustrated in FIG. 1, various target devices may include, e.g., target device 120 or 142. Source devices may include, e.g., wearable device 114, wearable device 116, mobile device 118, or computer 112.

In some embodiments, a source device may wirelessly connect to a target device, e.g., via a cellular network. In some embodiments, a source device may connect to a target device via a wired network, e.g., Ethernet. In some embodiments, a source device depicted in FIG. 1 may also serve as a target device, and vice versa. As will be described in more detail below, target devices and source devices may be respectively incorporated with corresponding teachings of the present disclosure to enable the RDMA with commit ACKs.

In various embodiments, improved RDMA capable hardware and the underlying protocol(s) are introduced to update target memory regions directly, but with the network acknowledgement deferred until the target write has been committed. No intermediate data copies may be necessary when target data buffers are updated directly. A single ACK may be generated only after the update to the target data buffers has been committed. In various embodiments, a remote process is not required to be running at the target system. The target system is not required to execute any software. In some embodiments, a target device may be simply implemented as a network interface controller (NIC) backed by non-volatile memory, even without general processing capabilities.

In embodiments, as described earlier, source devices in system 100 may include heterogeneous computing devices, such as, but not limited to, wearable devices 116 or 114, mobile device 118, or computer 112, incorporated with the teachings of the present disclosure. Wearable device 116 or 114 may be wearable miniature computers, also known as body-borne computers. In embodiments, wearable device 116 or 114 may have a device body or form factor with shape, dimension, and materials configured for the device to be worn by a user. As an example, wearable device 116 may have a form factor configured to be worn on a head, such as in the arrangement of eyeglasses. As another example, wearable device 114 may have a form factor configured to be worn on a wrist, such as in the arrangement of watches. In embodiments, wearable device 116 or 114 may also be worn by the wearer under, with, or on top of clothing near other parts of a human body, such as the arm, leg, neck, foot, etc.

In embodiments, computer 112 may be a laptop or a notebook with a clamshell form factor or a different form factor. In embodiments, mobile device 118 may be a portable communication device, such as a smartphone or a tablet computer. While not illustrated, source devices in system 100 may also include a handheld computer, a laptop, a cellular phone, a pager, an audio and/or video player (e.g., an MP3 player, a digital versatile disc (DVD) player, etc.), a gaming device, a video camera, a digital camera, a navigation device (e.g., a Global Positioning System (GPS) device), a wireless peripheral (e.g., a headset, etc.), and/or other suitable user electronic devices, enhanced with the teachings of the present disclosure.

In embodiments, wearable devices 116 and 114, mobile device 118, computer 112, target devices 120 or 142, or other suitable devices may be equipped with suitable modules, such as those illustrated in connection with FIG. 2, to enable the RDMA with commit ACKs. In some embodiments, these request or target devices may be configured to communicate with each other using Internet Protocols (IP) over the Internet. In some embodiments, these request or target devices may be configured to communicate with each other using dedicated short-range communications (DSRC), near field communication (NFC), or Bluetooth and Wi-Fi connections. Recognizing that the foregoing communication technologies were merely indicative of potential underlying communication technologies, which may be used between a source device and a target device, in other embodiments, different communication technologies may be used.

In embodiments, source devices or target devices in system 100 may be configured to communicate with cloud 140, a computing infrastructure complex. Cloud 140 may support cloud computing, which generally refers to an adequately resourced computing model with resources, such as hardware, storage, management solutions, security solutions, business applications, etc., available as services via networking. Cloud 140 may generally offer its services as infrastructure as a service (IaaS), platform as a service (PaaS), software as a service (SaaS), network as a service (NaaS), and communication as a service (CaaS). Moreover, cloud 140 may specifically offer services, based on one or more service types, such as IaaS, PaaS, SaaS, NaaS, or CaaS, supporting the RDMA with committed ACKs services.

In some embodiments, cloud 140 may include one or more server devices, for example, target device 142, incorporated with the teachings of the present disclosure, to cooperatively enable the RDMA with commit ACKs. In some embodiments, cloud 140 may use its server devices, such as networking server 144, to enable the RDMA with commit ACKs between a source device, e.g., computer 112, and a target device accessible to cloud 140, e.g., target device 120. In some embodiments, the source device may specify the criteria for RDMA, and networking server 144 may determine a suitable target device to receive the RDMA request, e.g., depending on the load on the target device.

In embodiments, cloud 140 may include one or more wireless and/or wired networks to operatively couple the source devices or target devices. Cloud 140 may be accessed via public and/or private networks, such as, but not limited to, the Internet, a telephone network (e.g., public switched telephone network (PSTN)), a local area network (LAN), a wide area network (WAN), a cable network, an Ethernet network, and so forth. Wireless communication networks may include various combinations of wireless personal area networks (WPANs), wireless local area networks (WLANs), wireless metropolitan area networks (WMANs), and/or wireless wide area networks (WWANs). In embodiments, a source device or a target device may be coupled to these networks via a cellular network and/or a wireless connection.

Figure 2:
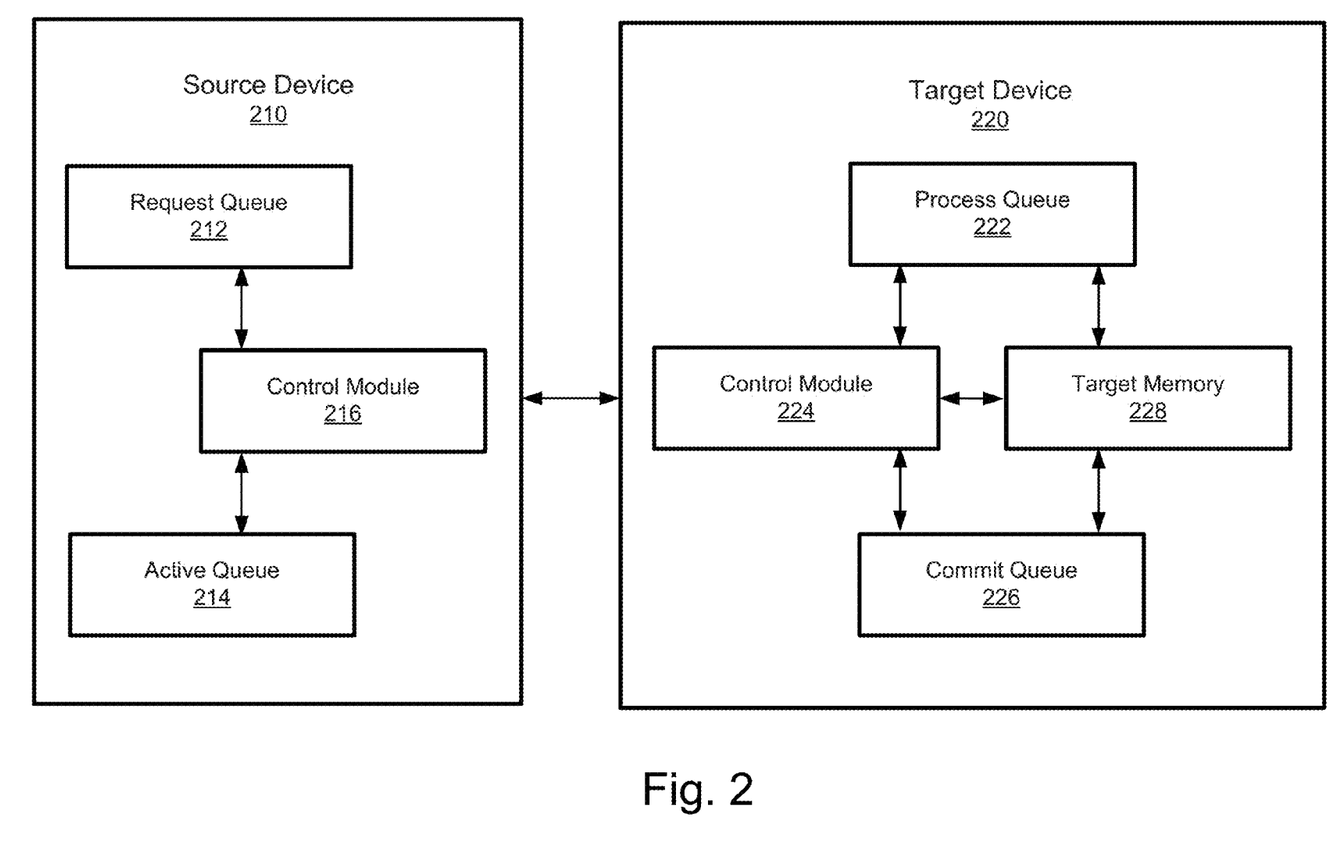
FIG. 2 is a schematic diagram illustrating an example source device and target device configured for the RDMA with commit ACKs, incorporating aspects of the present disclosure, in accordance with various embodiments.

Referring now to FIG. 2, an example implementation of source device 210 and target device 220 for the RDMA with commit ACKs, incorporating aspects of the present disclosure, in accordance with various embodiments, is illustrated. In embodiments, target device 220 may be a server device, such as target device 120 or 142 in FIG. 1. In embodiments, target device 220 may be a part of a distributed system with various components or subsystems distributed at various mobile or stationary devices. In embodiments, source device 210 may be similar to one of the source devices depicted in FIG. 1. In some embodiments, source device 210 or target device 220 may be implemented as a NIC in another computing device. In some embodiments, source device 210 or target device 220 may be implemented as a stand-alone device even without general computing capacity.

In embodiments, target device 220, in synergy with source device 210, may enable the RDMA with commit ACKs. In various embodiments, no source side buffering may be needed in order to replay the transfer of RDMA requests between the completion of the network transfer and the committing of the data to the target memory.

Source device 210 may include request queue 212. In embodiments, request queue 212 may be a computing module with associated suitable data structure to enqueue and/or dequeue RDMA requests. In some embodiments, a user or an application may submit a request, e.g., RDMA write, to source device 210. Source device 210 may then enqueue the request message to request queue 212. The request messages in request queue 212 may then be kept in order and processed accordingly. In some embodiments, the RDMA request may be generated by source device 210 automatically based on a preconfigured rule (e.g., database maintenance rule), triggered by an event (e.g., data synchronization triggered by local data modification), or other reasons leading to RDMA operations. In some embodiments, the request messages in request queue 212 may indicate that a remote commit is required.

Request queue 212 may be coupled to control module 216. In embodiments, control module 216 may modify the RDMA write protocol to indicate that network ACKs should be deferred until the target memory update has completed. As an example, control module 216 may indicate the request of "RDMA writes with commit ACKs" using a bit in the transport header that is carried in the last packet of the RDMA request to a target device. As an example, control module 216 may encode the request of "RDMA writes with commit ACKs" by other means, such as in the Direct Data Placement (DDP) header of the DDP segments associated with the RDMA message. In various embodiments, control module 216 may send the RDMA request over one or more networks to a target device, such as target device 220. The transferred RDMA request may indicate to the target device that a commit acknowledgement is required.

Once transferred, the request message may be moved from request queue 212 to active queue 214, which is coupled to the control module 216 and/or the request queue 212. Similar to request queue 212, active queue 214 may be another computing module with associated suitable data structure to enqueue and/or dequeue RDMA requests. Active queue 214 may store an RDMA request until it has been acknowledged. In some embodiments, control module 216 may facilitate retransmission of an RDMA request in active queue 214, e.g., if the requisite acknowledgement is not received within a time threshold. In some embodiments, control module 216 may manage the subsequent outbound RDMA requests based on the number of RDMA requests in active queue 214. As an example, control module 216 may refrain from sending new RDMA requests when the number of RDMA requests in active queue 214 exceeds a threshold number, which may indicate that the target device is overloaded.

In various embodiments, source device 210 may utilize one or more wireless or wired networks to communicate with target device 220. Those networks may include public and/or private networks, such as, but not limited to, local area networks (LANs), wide area networks (WANs), or the Internet. In some embodiments, those networks may include wireless networks, like wireless personal area networks (WPANs), wireless LANs (WLANs), wireless metropolitan area networks (WMANs), or wireless wide area networks (WWANs). In some embodiments, those networks may also include cellular networks.

Target device 220 may include process queue 222. Similar to request queue 212 or active queue 214, process queue 222 may be another computing module with associated suitable data structure to enqueue and/or dequeue RDMA requests received from a source device, e.g., source device 210. In some embodiments, the RDMA request may be an RDMA write, an atomic operation, or another type of request to update a target memory. In some embodiments, the RDMA request may include an indication for requiring a commit acknowledgement.

Process queue 222 may be coupled to control module 224. In various embodiments, control module 224 may be configured to process the RDMA requests in process queue 222. In some embodiments, control module 224 may determine whether a commit acknowledgement is required based on a commit ACK bit associated with the RDMA request, as described above. Upon processing the commit ACK bit, control module 224 may move the RDMA request from process queue 222 to commit queue 226. Meanwhile, control module 224 may issue a commit operation to the target memory associated with the RDMA request, e.g., target memory 228. In various embodiments, target memory 228 may be non-volatile memory, such as read-only memory, flash memory, ferroelectric random-access memory (F-RAM), magnetic computer storage devices (e.g., hard disks, magnetic tape), optical discs, etc. In some embodiments, target memory 228 may reside inside of target device 220. In other embodiments, target memory 228 may be located outside of target device 220, but accessible to target device 220, e.g., via a computing networking.

The format of the commit operation may depend on the target system architecture. As an example, in some computer architectures, a read against the target memory address updated by the RDMA request may result in flushing all system buffers external to target memory 228. Thus, control module 224 may issue a read against the target memory address updated by the RDMA request in order to confirm the commit operation, in some embodiments.

The interaction between control module 224 and target memory 228 may be architecturally specific. In some embodiments, target memory 228 may be host memory accessed by control module 224 over a local bus, such as a peripheral component interconnect (PCI) bus. In this case, control module 224 may issue a memory read request over the PCI bus to the written memory, in order to flush all system buffers. In some embodiments, control module 224 and target memory 228 may be integrated, whereas target memory 228 may be implemented as Serial Advanced Technology Attachment (SATA) or PCI Express storage devices based on Non-Volatile Memory Express (NVMe).

In some embodiments, target memory 228 may be behind a storage controller. In this case, the protocol would be extended from the control module 224 to the storage controller. Control module 224 may forward the RDMA request with data to the storage controller, which would write the data into a cache, NVMe region, or other storage devices, and signal control module 224 using an ACK once the write had been committed. The interface to the NVM or storage device may involve the use of command queues. Control module 224 may submit requests into a command queue for processing in this case, and the NVM may complete the operation using a completion queue or other mechanism monitored by control module 224.

On completion of the commit operation, control module 224 may generate and send an ACK back to source device 210 to indicate the completion of the commit operation. In some embodiments, control module 224 may mark the ACK with a commit bit to indicate that the operation was fully committed, especially to support interoperability with existing source devices without commit capability.

Figure 3:
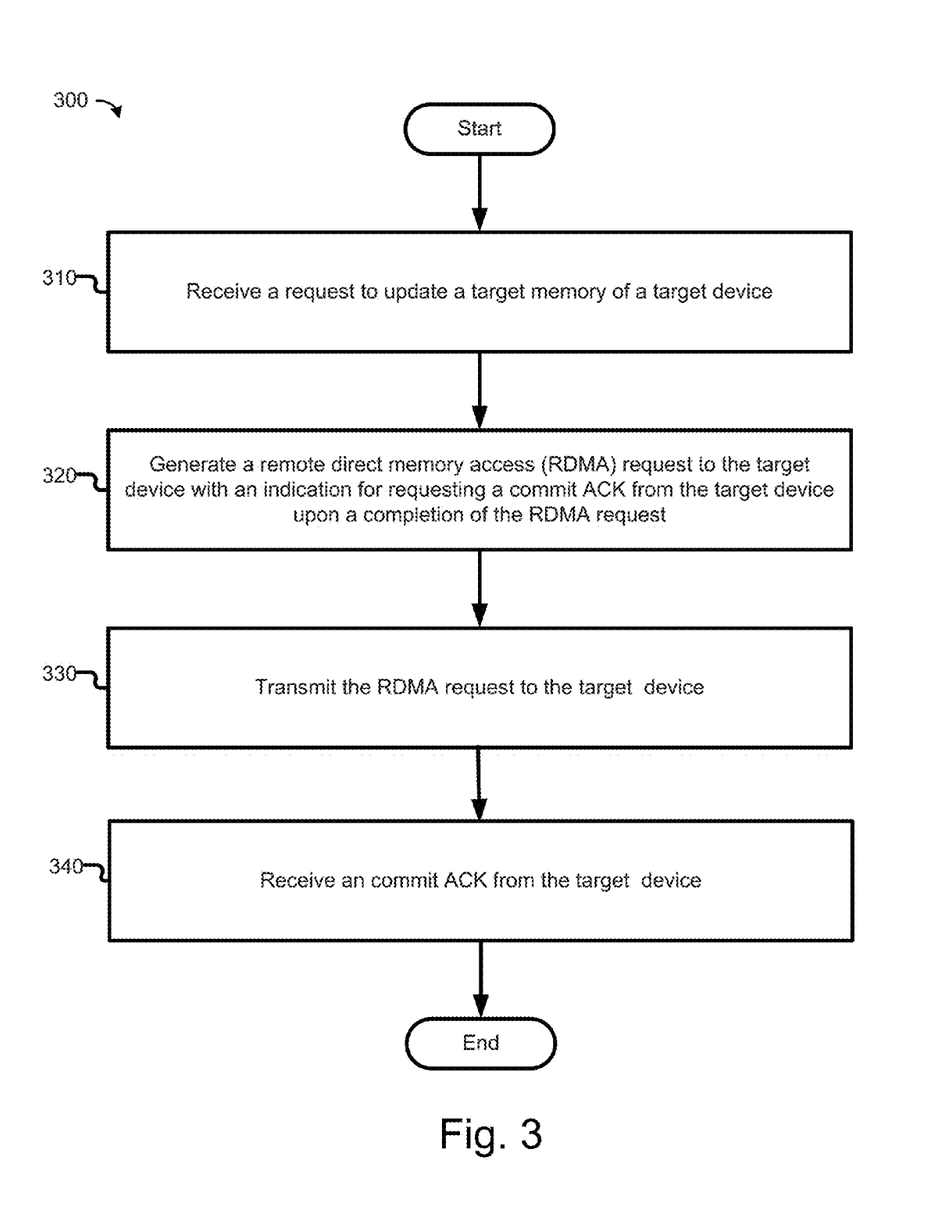
FIG. 3 is a flow diagram of an example process for providing the RDMA with commit ACKs, which may be practiced by an example source apparatus, incorporating aspects of the present disclosure, in accordance with various embodiments.

Referring now to FIG. 3, it is a flow diagram of an example process for providing the RDMA with commit ACKs, which may be practiced by an example source device in accordance with various embodiments. The process 300 may be performed by processing logic that comprises hardware (e.g., circuitry, dedicated logic, programmable logic, microcode, etc.), software (e.g., instructions run on a processing device to perform hardware simulation), or a combination thereof. The processing logic may be configured for facilitating the RDMA with commit ACKs. As such, process 300 may be performed by a computing device, e.g., source device 210, to implement one or more embodiments of the present disclosure.

In embodiments, the process may begin at block 310, where a request to update a target memory of a target device may be received, e.g., by source device 210. As discussed in connection with FIG. 2, in embodiments, the request may be initiated by a user or an application, or triggered by an event in source device 210. In various embodiments, the request may indicate that a remote commit is required. The request may be further enqueued, e.g., into request queue 212 of FIG. 2.

Next, at block 320, a remote direct memory access (RDMA) request to the target device may be generated with an indication for requesting a commit ACK from the target device upon a completion of the RDMA request, e.g., by control module 216. In some embodiments, control module 216 may mark a bit in a transport header of a last packet of the RDMA request as the indication for requesting the commit ACK.

Next, at block 330, the RDMA request may be transmitted to the target device, e.g., by control module 216. As discussed in connection with FIG. 2, the RDMA request may be transported via public and/or private networks, such as, but not limited to, LANs, WANs, or the Internet, to the target device. The transferred RDMA request may indicate that a commit acknowledgement is required. Once transferred, the RDMA request may be moved to an active queue from the request queue. The active queue may store the RDMA request until it has been acknowledged.

Next, at block 340, a commit ACK from the target device may be received, e.g., by control module 216. In some embodiments, upon receiving the commit ACK, the RDMA request corresponding to the received commit ACK, e.g., based on the identification of the RDMA request, may be removed from the active queue. In some embodiments, upon receiving the commit ACK, the source device may report the completed RDMA operation to the initiator. In some embodiments, the source device may remove the RDMA request corresponding to the received commit ACK from the active queue based on a commit bit on the commit ACK received from the target device.

Figure 4:
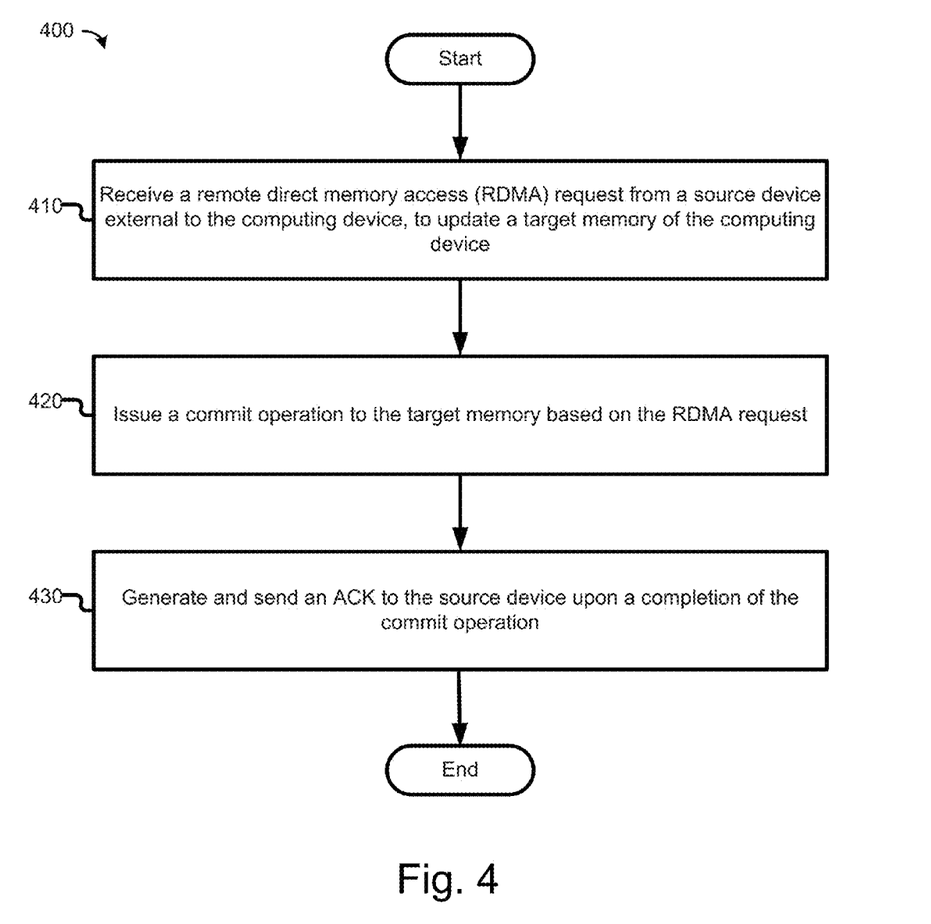
FIG. 4 is a flow diagram of another example process for providing the RDMA with commit ACKs, which may be practiced by an example target apparatus, incorporating aspects of the present disclosure, in accordance with various embodiments.

Referring now to FIG. 4, it is a flow diagram of another example process for providing the RDMA with commit ACKs, which may be practiced by an example target device, in accordance with various embodiments. The process 400 may be performed by processing logic that comprises hardware (e.g., circuitry, dedicated logic, programmable logic, microcode, etc.), software (e.g., instructions run on a processing device to perform hardware simulation), or a combination thereof. The processing logic may be configured for facilitating the RDMA with commit ACKs. As such, process 400 may be performed by a computing device, e.g., target device 220, to implement one or more embodiments of the present disclosure. In embodiments, various blocks in FIG. 4 may be combined or arranged in any suitable order, e.g., according to the particular embodiment of a target device, to enable the RDMA with commit ACKs.

In embodiments, the process may begin at block 410, where an RDMA request may be received from a source device external to the computing device, to update a target memory of the computing device, e.g., by target device 220 of FIG. 2. In embodiments, the RDMA request may be an RDMA write, an atomic operation, or another type of request to update the target memory. In embodiments, the RDMA request may be enqueued into a process queue, e.g., process queue 222 of FIG. 2. In some embodiments, the RDMA request may include an indication, e.g., a commit ACK bit, that a commit ACK is requested for the RDMA operation. Upon processing the commit ACK bit, the target device may move the RDMA request from the process queue to a commit queue, e.g., commit queue 226 of FIG. 2.

Next, at block 420, a commit operation to the target memory may be issued based on the RDMA request, e.g., by control module 224 of FIG. 2. In some embodiments, the commit operation may include an RDMA write or an atomic operation. In some embodiments, the control module may issue a read against a target memory address updated by the RDMA request to confirm the commit operation since the read may result in flushing all system buffers associated with the target memory address. In some embodiments, the control module may issue a memory read request over a computer bus to the target memory when the target memory is accessed by the computing device over the computer bus. In some embodiments, the control module may send a request to a storage controller controlling the target memory to conduct the commit operation. In various embodiments, the format of the commit operation may depend on the target system architecture.

Next, at block 430, an ACK may be generated and sent to the source device upon a completion of the commit operation, e.g., by control module 224. In embodiments, the ACK may be generated based on the indication of the completion of the commit operation. In some embodiments, the indication of the completion of the commit operation may be a successful read to the target memory address. In some embodiments, the indication of the completion of the commit operation may be another ACK received from a storage controller indicating the completion of the commit operation. In some embodiments, the ACK may be marked with a commit bit to indicate that the requested RDMA operation has been fully committed. In various embodiments, such ACK is deferred until the target write is committed, then the ACK is sent back to the source device.

Figure 5:
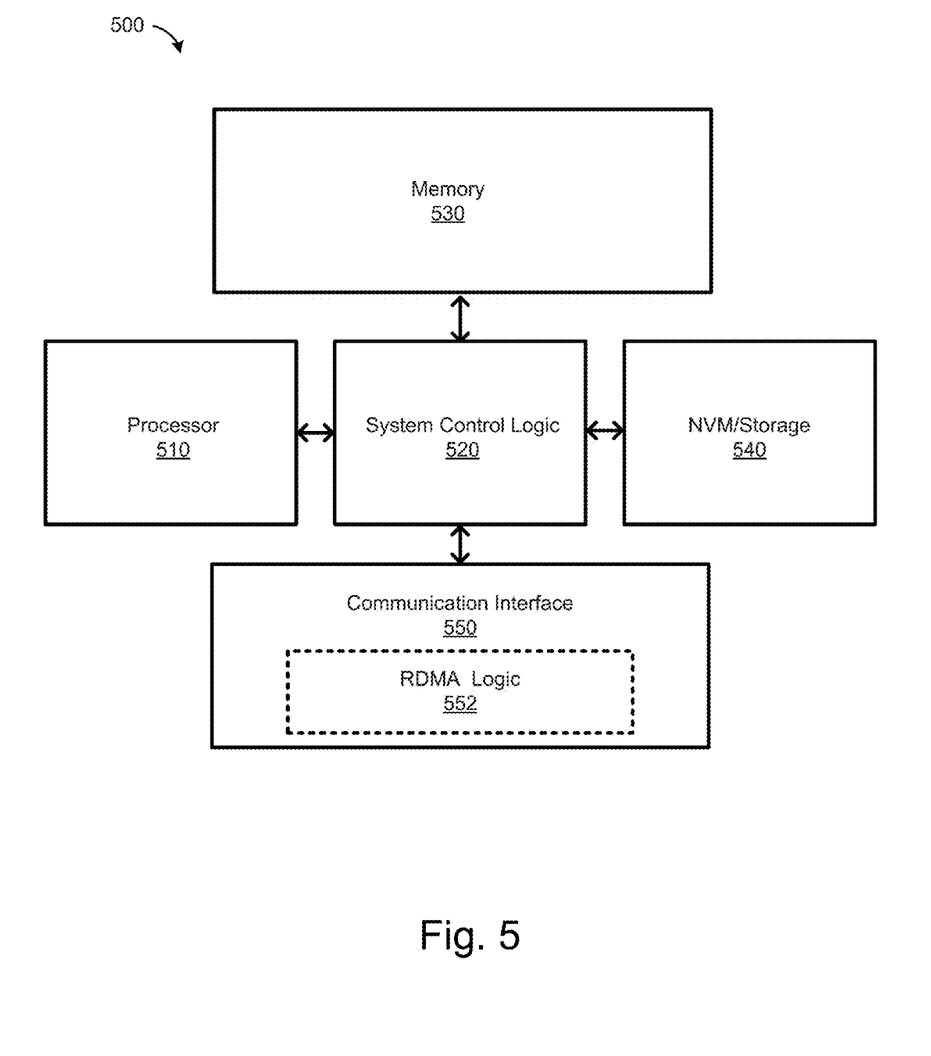
FIG. 5 illustrates an example computing device suitable for practicing the disclosed embodiments, in accordance with various embodiments.

FIG. 5 illustrates an embodiment of a computing device 500 suitable for practicing embodiments of the present disclosure. Computing device 500 may be any computing device that is within a user's reach (e.g., a device that the user carries, wears, touches, gestures, etc.), in forms such as a smartphone, a tablet, a laptop, a wearable device, a server, etc. As illustrated, computing device 500 may include system control logic 520 coupled to processor 510, to system memory 530, to non-volatile memory (NVM)/storage 540, and to communication interface 550. In various embodiments, processor 510 may include one or more processor cores.

In embodiments, communication interface 550 may provide an interface for computing device 500 to communicate with the variety of source devices, the variety of target devices, or the variety of systems/services in the cloud as previously discussed in connection with FIG. 1. In embodiments, communication interface 550 may provide an interface for computing device 500 to communicate over one or more network(s) and/or with any other suitable device. Communication interface 550 may include any suitable hardware and/or firmware, such as a network adapter, a network interface card, one or more antennas, wireless interface(s), and so forth. In various embodiments, communication interface 550 may include an interface for computing device 500 to use radio-frequency identification (RFID), near field communication (NFC), optical communications, or other similar technologies to communicate directly (e.g., without an intermediary) with another device. In various embodiments, communication interface 550 may interoperate with radio communications technologies such as, for example, Wideband Code Division Multiple Access (WCDMA), Global System for Mobile Communications (GSM), Long Term Evolution (LTE), Bluetooth®, Zigbee, and the like.

In embodiments, communication interface 550 may include, in particular, the logic to practice RDMA with commit ACK as earlier described, collectively denoted as RDMA with commit ACK 552. RDMA with commit ACK 552 may include instructions that, when executed by processor 510, result in computing device 500 providing the RDMA with ACKs, such as, but not limited to, processes 300 and 400.

In embodiments, RDMA with commit ACK 552 may include instructions that, when executed by processor 510, result in computing device 500 performing various functions associated with request queue 212, control module 216, active queue 214, process queue 222, control module 224, and commit queue 226, in connection with FIG. 2.

In some embodiments, system control logic 520 may include any suitable interface controllers to provide for any suitable interface to the processor 510 and/or to any suitable device or component in communication with system control logic 520. System control logic 520 may also interoperate with a display (not shown) for the display of information, such as to a user. In various embodiments, the display may include one of various display formats and forms, such as, for example, liquid-crystal displays, cathode-ray tube displays, e-ink displays, projection displays. In various embodiments, the display may include a touch screen.

In some embodiments, system control logic 520 may include one or more memory controller(s) (not shown) to provide an interface to system memory 530. System memory 530 may be used to load and store data and/or instructions, for example, for computing device 500. System memory 530 may include any suitable volatile memory, such as dynamic random access memory (DRAM), for example.

In some embodiments, system control logic 520 may include one or more input/output (I/O) controller(s) (not shown) to provide an interface to NVM/storage 540 and communication interface 550. NVM/storage 540 may be used to store data and/or instructions, for example. NVM/storage 540 may include any suitable non-volatile memory, such as flash memory, for example, and/or may include any suitable non-volatile storage device(s), such as one or more hard disk drive(s) (HDD), one or more solid-state drive(s), one or more compact disc (CD) drive(s), and/or one or more digital versatile disc (DVD) drive(s), for example. NVM/storage 540 may include a storage resource that is physically part of a device on which computing device 500 is installed or it may be accessible by, but not necessarily a part of, computing device 500. For example, NVM/storage 540 may be accessed by computing device 500 over a network via communication interface 550. In various embodiments, NVM/storage 540 may include the target memory 228 of FIG. 2.

In some embodiments, processor 510 may be packaged together with memory having system control logic 520 and/or logic of RDMA with commit ACK 552. In some embodiments, at least one of the processor(s) 510 may be packaged together with memory having system control logic 520 and/or logic of RDMA with commit ACK 552 to form a System in Package (SiP). In some embodiments, processor 510 may be integrated on the same die with memory having system control logic 520 and/or logic of RDMA with commit ACK 552. In some embodiments, processor 510 may be integrated on the same die with memory having system control logic 520 and/or logic of RDMA with commit ACK 552 to form a System on Chip (i).

Depending on which modules of source device 210 or target device 220 in connection with FIG. 2 are hosted by computing device 500, the capabilities and/or performance characteristics of processor 510, system memory 530, and so forth, may vary. In various implementations, computing device 500 may be a smartphone, a tablet, a mobile computing device, a wearable computing device, a server, etc., enhanced with the teachings of the present disclosure.

Figure 6:
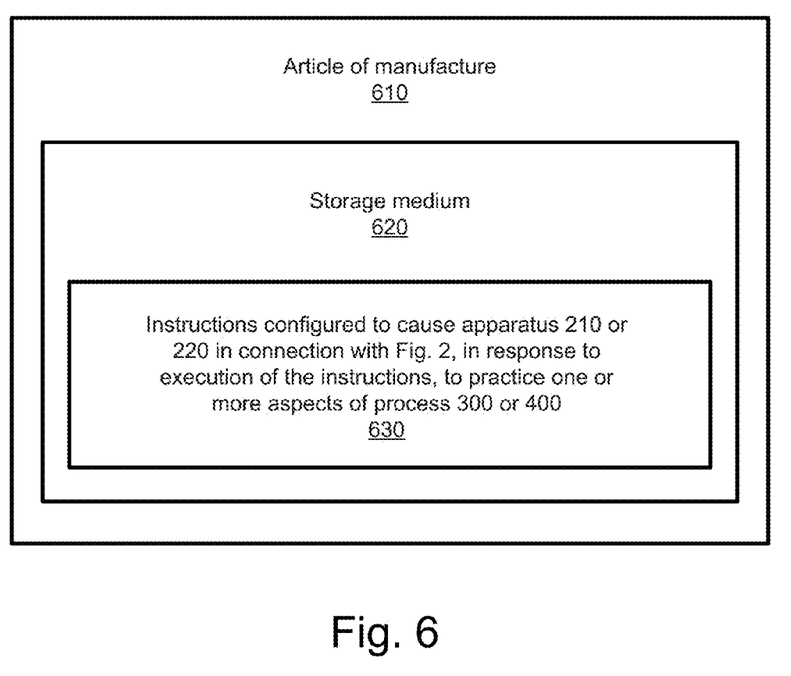
FIG. 6 illustrates an article of manufacture having programming instructions, incorporating aspects of the present disclosure, in accordance with various embodiments.

FIG. 6 illustrates an article of manufacture 610 having programming instructions, incorporating aspects of the present disclosure, in accordance with various embodiments. In various embodiments, an article of manufacture may be employed to implement various embodiments of the present disclosure. As shown, the article of manufacture 610 may include a computer-readable non-transitory storage medium 620 where instructions 630 are configured to practice embodiments of or aspects of embodiments of any one of the processes described herein. The storage medium 620 may represent a broad range of persistent storage media known in the art, including but not limited to flash memory, dynamic random access memory, static random access memory, an optical disk, a magnetic disk, etc. Instructions 630 may enable an apparatus, in response to their execution by the apparatus, to perform various operations described herein. As an example, storage medium 620 may include instructions 630 configured to cause an apparatus, e.g., source device 210, to practice some aspects of the RDMA with commit ACKs, as illustrated in process 300 of FIG. 3, in accordance with embodiments of the present disclosure. As another example, storage medium 620 may include instructions 630 configured to cause an apparatus, e.g., target device 220, to practice some aspects of the RDMA with commit ACKs, as illustrated in process 400 of FIG. 4, in accordance with embodiments of the present disclosure. In embodiments, computer-readable storage medium 620 may include one or more computer-readable non-transitory storage media. In other embodiments, computer-readable storage medium 620 may be transitory, such as signals, encoded with instructions 630.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

The following paragraphs describe examples of various embodiments.

Example 1 is an apparatus for remote direct memory access (RDMA), which may include a process queue to store a RDMA request from an initiator external to the apparatus to update a target memory; and a control module, coupled to the process queue, to issue a commit operation to the target memory based on the RDMA request; and generate an acknowledgement, ACK, to be transferred to the initiator on completion of the commit operation.

Example 2 may include the subject matter of Example 1, and may further include a commit queue, coupled to the control module and the process queue, to store the RDMA request transferred from the process queue, wherein the control module is to transfer the RDMA request from the process queue to the commit queue based at least in part on a commit ACK bit in the RDMA request.

Example 3 may include the subject matter of Example 1 or 2, and may further specify that the control module is to generate the ACK based at least in part on a commit ACK bit in the RDMA request.

Example 4 may include any subject matter of Examples 1-3, and may further specify that the control module is to issue the commit operation for an RDMA write as an atomic operation or to issue the commit operation based on a system architecture related to the target memory.

Example 5 may include any subject matter of Examples 1-4, and may further specify that the control module is to issue the commit operation based on a memory read request over a peripheral component interconnect (PCI) bus to the target memory when the target memory is accessed by the apparatus over the PCI bus.

Example 6 may include any subject matter of Examples 1-5, and may further specify that the control module is to issue the commit operation based on a storage controller controlling the target memory, and to generate the ACK based on another ACK received from the storage controller indicating the completion of the commit operation.

Example 7 may include any subject matter of Examples 1-6, and may further specify that the control module is to issue a read against a target memory address updated by the RDMA request.

Example 8 may include any subject matter of Examples 1-7, and may further specify that the control module is to mark the ACK with a commit bit to indicate the completion of the commit operation.

Example 9 may include any subject matter of Examples 1-8, and may further include the target memory and at least one processor.

Example 10 is a method for remote direct memory access (RDMA), which may include receiving, by a computing device, a RDMA request from an initiator external to the computing device, to update a target memory of the computing device; issuing, by the computing device, a commit operation to the target memory based on the RDMA request; and generating, by the computing device, an acknowledgement, ACK, to be sent to the initiator upon a completion of the commit operation.

Example 11 may include the subject matter of Example 10, and may further include storing, by the computing device, the RDMA request on a process queue; and transferring, by the computing device, the RDMA request from the process queue to a commit queue based on a commit ACK bit on the RDMA request.

Example 12 may include the subject matter of Example 10 or 11, and may further include sending, by the computing device, a memory read request over a computer bus to the target memory when the target memory is accessed by the computing device over the computer bus.

Example 13 may include any subject matter of Examples 10-12, and may further include sending, by the computing device, a request to a storage controller controlling the target memory to conduct the commit operation; and generating, by the computing device, the ACK based on another ACK received from the storage controller indicating the completion of the commit operation.

Example 14 may include any subject matter of Examples 10-13, and may further include issuing, by the computing device, a read against a target memory address updated by the RDMA request.

Example 15 may include any subject matter of Examples 10-14, and may further include marking, by the computing device, the ACK with a commit bit to indicate the completion of the commit operation.

Example 16 may include any subject matter of Examples 10-15, and may further specify that the commit operation includes an RDMA write or an atomic operation.

Example 17 is at least one storage medium, which may include a plurality of instructions configured to cause an apparatus, in response to execution of the instructions by the apparatus, to practice any subject matter of Examples 10-16.

Example 18 is an apparatus for RDMA, which may include means for receiving a RDMA request from an initiator external to the computing device, to update a target memory of the computing device; means for issuing a commit operation to the target memory based on the RDMA request; and means for generating, by the computing device, an acknowledgement, ACK, to be sent to the initiator upon a completion of the commit operation.

Example 19 may include the subject matter of Example 18, and may further include means for storing the RDMA request on a process queue; and means for transferring the RDMA request from the process queue to a commit queue based on a commit ACK bit on the RDMA request.

Example 20 may include the subject matter of Example 18 or 19, and may further include means for sending a memory read request over a computer bus to the target memory when the target memory is accessed by the computing device over the computer bus.

Example 21 may include any subject matter of Examples 18-20, and may further include means for sending a request to a storage controller controlling the target memory to conduct the commit operation; and means for generating the ACK based on another ACK received from the storage controller indicating the completion of the commit operation.

Example 22 may include any subject matter of Examples 18-21, and may further include means for issuing a read against a target memory address updated by the RDMA request.

Example 23 may include any subject matter of Examples 18-22, and may further include means for marking the ACK with a commit bit to indicate the completion of the commit operation.

Example 24 is an apparatus for RDMA, which may include a request queue to store a remote direct memory access (RDMA) request to update a target memory outside of a fault domain; and a control module, coupled to the request queue, to transfer the RDMA request to a target device with an indication for requesting a commit ACK from the target device upon completion of the RDMA request by the target device.

Example 25 may include the subject matter of Example 24, and may further include an active queue, coupled to the control module and the request queue, to store the RDMA request transferred from the request queue.

Example 26 may include the subject matter of Example 24 or 25, and may further specify that the control module is to transfer the RDMA request from the request queue to the active queue, and to remove the RDMA request from the active queue upon receiving the commit ACK from the target device.

Example 27 may include any subject matter of Examples 24-26, and may further specify that the control module is to mark the indication for requesting the commit ACK based on a bit in a transport header of a last packet of the RDMA request.

Example 28 may include any subject matter of Examples 24-27, and may further specify that the control module is to remove the RDMA request from the active queue based on a commit bit on the commit ACK received from the target device.

Example 29 may include any subject matter of Examples 24-28, and may further include the target memory and at least one processor.

Example 30 is a method for RDMA, which may include receiving, by a computing device, a memory request from an initiator to update a target memory; generating, by the computing device, a remote direct memory access (RDMA) request, based on the memory request, to a target device, with an indication for requesting a commit ACK from the target device upon completion of the RDMA request by the target device; and transmitting, by the computing device, the RDMA request to the target device.

Example 31 may include the subject matter of Example 30, and may further include marking, by the computing device, a bit in a transport header of a last packet of the RDMA request as the indication for requesting the commit ACK.

Example 32 may include the subject matter of Example 30 or 31, and may further include storing, by the computing device, the RDMA request on a request queue; transferring, by the computing device, the RDMA request from the request queue to an active queue; receiving the commit ACK from the target device; and removing, by the computing device, the RDMA request from the active queue upon receiving the commit ACK from the target device.

Example 33 may include any subject matter of Example 32, and may further specify the removing is further based on a commit bit on the commit ACK received from the target device.

Example 34 is at least one storage medium, which may include a plurality of instructions configured to cause an apparatus, in response to execution of the instructions by the apparatus, to practice any subject matter of Examples 30-33.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus, comprising:
a network interface card (NIC) having:
a process queue to store a remote direct memory access (RDMA) request from an initiator external to the apparatus to update a target memory communicatively coupled to the apparatus, the RDMA request including a commit bit to indicate the apparatus to provide an acknowledgment (ACK) after update of the target memory has been committed;
a control module, coupled to the process queue, to issue an update and a commit operation to the target memory based on the RDMA request, and prior to subsequent communication with the initiator and on commit of the update operation, generate the ACK, marked with a commit ACK bit, and after generation of the ACK marked with the commit ACK bit, transfer the ACK back to the initiator; and
a commit queue, coupled to the control module and the process queue, to store the RDMA request transferred from the process queue, wherein the control module is to transfer the RDMA request from the process queue to the commit queue based at least in part on the commit bit in the RDMA request.

2. The apparatus according to claim 1, wherein the control module is to generate the ACK based at least in part on the commit bit in the RDMA request.

3. The apparatus according to claim 1, wherein the control module is to issue the commit operation for an RDMA write as an atomic operation or to issue the commit operation based on a system architecture related to the target memory.

4. The apparatus according to claim 1, wherein the control module is to issue the commit operation based on a memory read request over a peripheral component interconnect (PCI) bus to the target memory when the target memory is accessed by the apparatus over the PCI bus.

5. The apparatus according to claim 1, wherein the control module is to issue the commit operation based on a storage controller controlling the target memory, and to generate the ACK based on another ACK received from the storage controller indicating completion of the commit operation.

6. The apparatus according to claim 1, wherein the control module is to issue a read against a target memory address updated by the RDMA request.

7. The apparatus according to claim 1, wherein the control module is to mark the ACK with the commit ACK bit to indicate completion of the commit operation.

8. The apparatus according to claim 1, further comprising the target memory and at least one processor.

9. A method, comprising:
receiving, by a computing device, a remote direct memory access (RDMA) request from an initiator external to the computing device, to update a target memory communicatively coupled to the computing device, the RDMA request including a commit bit to indicate the computing device to provide an acknowledgment (ACK), after update of the target memory has been committed;
storing, by the computing device, the RDMA request on a process queue;
transferring, by the computing device, the RDMA request from the process queue to a commit queue based on the commit bit on the RDMA request;
issuing, by the computing device, an update and a commit operation to the target memory based on the RDMA request; and
generating, by the computing device, the ACK, prior to any subsequent communication with the initiator and after commit of the update operation, and marking the ACK with a commit ACK bit to be sent to the initiator upon a completion of the commit operation.

10. The method of claim 9, further comprising:
sending, by the computing device, a memory read request over a computer bus to the target memory when the target memory is accessed by the computing device over the computer bus.

11. The method of claim 9, further comprising:
sending, by the computing device, a request to a storage controller controlling the target memory to conduct the commit operation; and
generating, by the computing device, the ACK based on another ACK received from the storage controller indicating the completion of the commit operation.

12. The method of claim 9, further comprising:
issuing, by the computing device, a read against a target memory address updated by the RDMA request.

13. The method of claim 9, wherein marking, by the computing device, the ACK with the commit ACK bit indicates the completion of the commit operation.

14. The method of claim 9, wherein the commit operation comprises an RDMA write or an atomic operation.

15. An apparatus, comprising:
a network interface card (NIC) to implement:
a request queue to store a remote direct memory access (RDMA) request to update a target memory outside of a fault domain, the RDMA request including a commit bit to indicate a target device to provide an acknowledgment (ACK) after update of the target memory has been committed;
a control module, coupled to the request queue, to transfer the RDMA request to the target device with the commit bit, wherein the ACK is to be marked with a commit ACK bit upon completion of the RDMA request and received in a first subsequent reply from the target device; and
an active queue, coupled to the control module and the request queue, to store the RDMA request transferred from the request queue, wherein the control module is to transfer the RDMA request from the request queue to the active queue, and to remove the RDMA request from the active queue upon receiving the ACK marked with the commit ACK bit from the target device.

16. The apparatus according to claim 15, wherein the control module is to mark the commit bit based on a bit in a transport header of a last packet of the RDMA request.

17. The apparatus according to claim 15, further comprising the target memory and at least one processor.

18. A method, comprising:
receiving, by a network interface card (NIC) in a computing device, a memory request to update a target memory;
generating, by RDMA capable hardware in the computing device, an RDMA request, based on the memory request, to a target device, with an associated indication including a commit bit for requesting a commit ACK from the target device after update of the target memory has been committed, wherein the commit ACK is to be marked by a commit ACK bit as the associated indication and is to be received from the target device in a first subsequent reply from the target device;
transmitting, by the NIC in the computing device, the RDMA request to the target device;
storing, by the computing device, the RDMA request on a request queue;
transferring, by the computing device, the RDMA request from the request queue to an active queue;
receiving the commit ACK from the target device; and
removing, by the computing device, the RDMA request from the active queue upon receiving the commit ACK from the target device.

19. The method of claim 18, further comprising:
marking, by the computing device, a bit in a transport header of a last packet of the RDMA request as the commit bit for requesting the commit ACK.

20. The method according to claim 18, wherein the removing is further based on the commit ACK bit on the commit ACK received from the target device.

21. The apparatus of claim 1, wherein the commit bit to provide the ACK after update of the target memory has been committed is provided outside an RDMA protocol.

22. The apparatus of claim 21, wherein the commit bit to provide the ACK after update of the target memory is provided via a Direct Data Placement (DDP) header of a DDP segment associated with the RDMA request.

* * * * *